(12) United States Patent
Jansen

(10) Patent No.: US 7,678,035 B2
(45) Date of Patent: Mar. 16, 2010

(54) FOLDED BOX GLUING MACHINE WITH IMPROVED ACCESSIBILITY

(75) Inventor: Frank Jansen, Krefeld (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 42 days.

(21) Appl. No.: 12/184,320

(22) Filed: Aug. 1, 2008

(65) Prior Publication Data

US 2009/0062095 A1 Mar. 5, 2009

(30) Foreign Application Priority Data

Aug. 27, 2007 (DE) .................. 10 2007 040 626

(51) Int. Cl.
*B31B 49/00* (2006.01)
(52) U.S. Cl. .............. 493/38; 493/56; 493/71; 493/81; 493/128; 53/77; 53/383.1
(58) Field of Classification Search ............. 53/383.1, 53/382.1, 382.2, 382.3, 77; 493/38, 52, 56, 493/69–72, 79–82, 128, 132
See application file for complete search history.

(56) References Cited

U.S. PATENT DOCUMENTS

| | | | |
|---|---|---|---|
| 2,058,668 A * | 10/1936 | Davis .................. 38/40 |
| 4,119,018 A | 10/1978 | Nava | |
| 4,545,176 A * | 10/1985 | Marchetti .................. 53/76 |
| 4,604,083 A * | 8/1986 | Barny et al. .................. 493/34 |
| 4,685,269 A * | 8/1987 | Marchetti .................. 53/167 |
| 5,147,268 A * | 9/1992 | Cermeno .................. 493/38 |
| 5,367,158 A | 11/1994 | Herman et al. | |
| 5,665,961 A | 9/1997 | Matzka | |
| 5,746,690 A | 5/1998 | Humbarger et al. | |
| 5,805,451 A * | 9/1998 | Speas et al. .................. 700/110 |
| 7,402,129 B2 | 7/2008 | Diehr | |
| 2006/0190101 A1 * | 8/2006 | Seizinger .................. 700/79 |

FOREIGN PATENT DOCUMENTS

DE 103 10 236 B3 2/2004
DE 10 2004 022 212 A1 12/2005

* cited by examiner

*Primary Examiner*—Christopher Harmon
(74) *Attorney, Agent, or Firm*—Keating & Bennett, LLP

(57) ABSTRACT

A folded box gluing machine for the processing of folded box blanks includes at least one feeder unit arranged to transport the folded box blanks to downstream processing stations including a folding station, a glue applicator unit, a transfer station, a gathering and pressing mechanism, and a safety mechanism for a machine component presenting a danger to the human operator defined by a light curtain. The safety mechanism can be deactivated via a mobile operator unit, and the operator unit is designed such that it can only be operated with both hands.

8 Claims, 4 Drawing Sheets

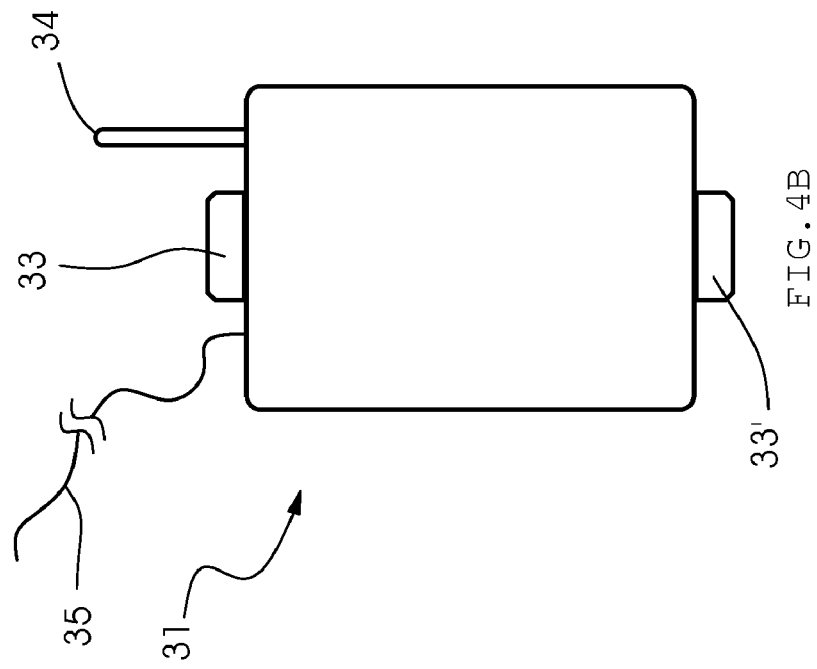
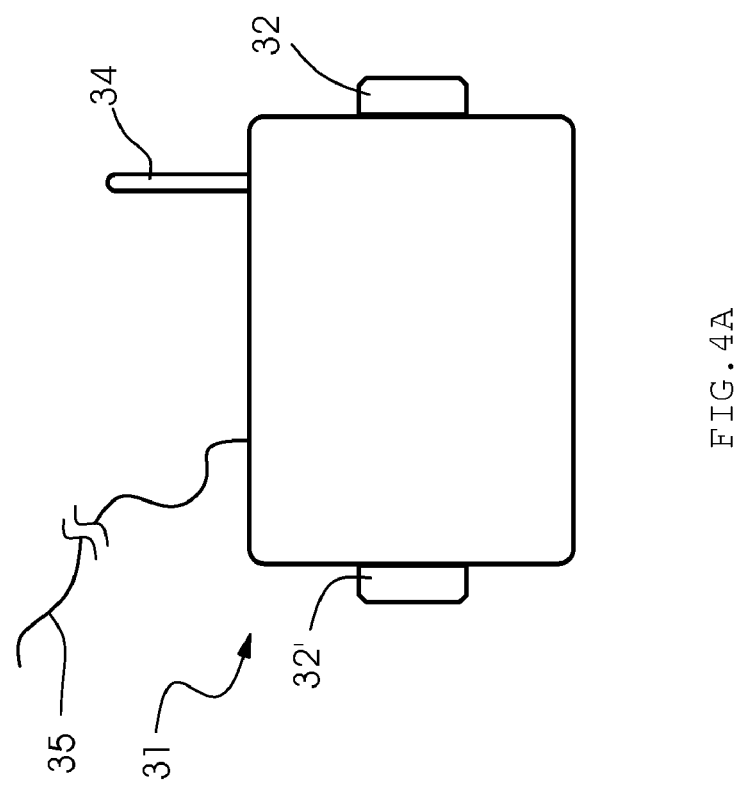

FOLDED BOX GLUING MACHINE WITH IMPROVED ACCESSIBILITY

BACKGROUND OF THE INVENTION

1. Field of the Invention

The present invention relates to a folded box gluing machine for processing of folded box blanks, including at least one feeder unit for filling a downstream processing station, a folding station, a glue applicator unit, a transfer station, especially with an exiting mechanism, a gathering and pressing mechanism and a safety mechanism for a machine portion which presents a danger to the human operator.

2. Description of the Related Art

Folded box gluing machines for producing folded boxes from folded box blanks usually have at least the following modules as processing stations:

A feeder unit, which pulls the blanks being processed at high speed from a stack, one after the other, and feeds them individually to the first processing station downstream.

An adhesive applicator unit, usually for glue, which applies a strip of adhesive to the folded flaps being glued together.

A folding station, where the parts of the cut blank provided with a glue strip are moved through 180°, i.e., folded, to make a glue connection.

After the folding station, a transfer station is typically provided, where the boxes can be counted, marked, and fed therethrough. After this, a gathering and pressing station is provided, at the start of which a stream of folded blanks is formed, which is held under pressure for a desired time in the pressing station, so that the two portions of the blank are joined at the glue seam.

In order to make folds transverse to the direction of transport of the folded box blanks, additional devices are installed in the folded box gluing machine. Such devices are known, for example, from U.S. Pat. No. 4,119,018. They are used to make folded boxes with or without triangular flaps, as is customary for the 4-point, 6-point, folded bottom or special boxes. In one known device of this type, the rear folding tools are hooks mounted beneath the transport level, which grab from underneath the rear web, initially lying flat, with their free ends bent at right angles and overtake the blank as it continues to be transported, so that the web is folded inward and lies flat on the folded box blank. Such a folding tool is also called an overtaking hook. In order to make such overtaking hooks safe for the operator of the machine, and they move very fast during the operation of the folded box gluing machine, this area can be provided with an entry protection, such as a safety door. But these safety measures needlessly restrict the accessibility of the folded box gluing machine, especially when processing blanks that are to be processed without the use of overtaking hooks.

DE 10 2004 022 212 A1 discloses a folded box gluing machine with a safety mechanism in the form of a light curtain. The light curtain is arranged in side uprights of the folded box gluing machine and can be optionally activated or deactivated, depending on whether or not an overtaking hook is used.

Such safety mechanisms protect the machine operator from injuries caused by the overtaking shafts or hooks of the machine. Adjustment of the overtaking shafts or hooks and of the folded box produced by the folding process is possible at a standstill or up to a ground speed of the machine of about 20 m/min. But as soon as the speed of the machine is greater than the ground speed of the machine, the light curtain of the machine is switched on. For the machine operator, this means that he must be outside of the light curtain in order for the machine to run at production speed.

Since the side uprights in which the safety mechanism is installed have a spacing of about 1 m from the machine, it is nearly impossible for the operator to observe whether the process sequences are running properly, for example, at the middle of the machine or in the rough crusher. Thus, the machine operator cannot know where an adjustment change might need to be made in the folding elements to adapt the folding process to the machine speed.

DE 103 10 236 B3 discloses a safety mechanism in the delivery unit of a sheet processing machine, wherein the operator can deactivate individual access areas by an input device to carry out a servicing for a predetermined interval of time. But providing such a deactivation for a folded box gluing machine as disclosed in DE 10 2004 022 212 A1 presents the risk that the operator will be tempted to reach into the running machine to make necessary adjustments, since the operator has both hands free. Thus, the risk of injury is not sufficiently minimized.

SUMMARY OF THE INVENTION

To overcome the problems described above, preferred embodiments of the present invention provide a folded box gluing machine for processing folded box blanks that conforms to safety regulations and thus protects the operator against dangers, while only minimally impairing the accessibility to the folded box gluing machine.

Preferred embodiments of the present invention include a mobile operator unit, with which a safety mechanism can be deactivated, which improves the accessibility to the folded box gluing machine. In addition, in order to prevent the operator from reaching with one or both hands into the machine while it is running, the mobile operator unit for deactivation of the safety mechanism must be operated with both hands by the operator. To make sure of this, the mobile operator unit includes corresponding contacts. If the mobile operator unit is operated with only one hand, i.e., operated at one contact, the safety mechanism will not be deactivated. Likewise, the safety mechanism will be reactivated at once if the operator, after having touched both contacts for the deactivation, releases one contact again.

The contacts are preferably disposed on opposite sides of the mobile operator unit, i.e., either right and left, or top and bottom, or on the upper side and lower side. This ensures that the operator indeed has both hands on the mobile operator unit when deactivating the safety mechanism.

In one preferred embodiment, the contacts preferably are press switches. As soon as the pressure is removed from one of the switches, i.e., the operator takes his hand off of the switch, the safety mechanism is immediately reactivated.

Preferably, the contacts include a device for capacitive measurement. This makes it possible to measure whether identical surfaces are placed against both contacts. For example, this prevents the operator from operating the mobile operator unit with only one hand while pressing the other contact against another surface. Thus, the capacitive measurement distinguishes between skin and another surface, such as a side wall of the machine.

Preferably, the mobile operator unit is connected either by a cable or wirelessly to the safety mechanism. This makes it possible for the operator to observe the process sequences from the immediate vicinity, while protecting the operator's hands with the mobile operator unit.

In order to provide the operator with additional assistance regarding the status of the safety mechanism, the status is preferably indicated via an acoustical or optical signal.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4A is a top view of a mobile unit for deactivating the safety mechanism according to a preferred embodiment of the present invention.

FIG. 4B is a top view of a mobile unit for deactivating the safety mechanism according to another preferred embodiment of the present invention.

DETAILED DESCRIPTION OF PREFERRED EMBODIMENTS

Figure 1:
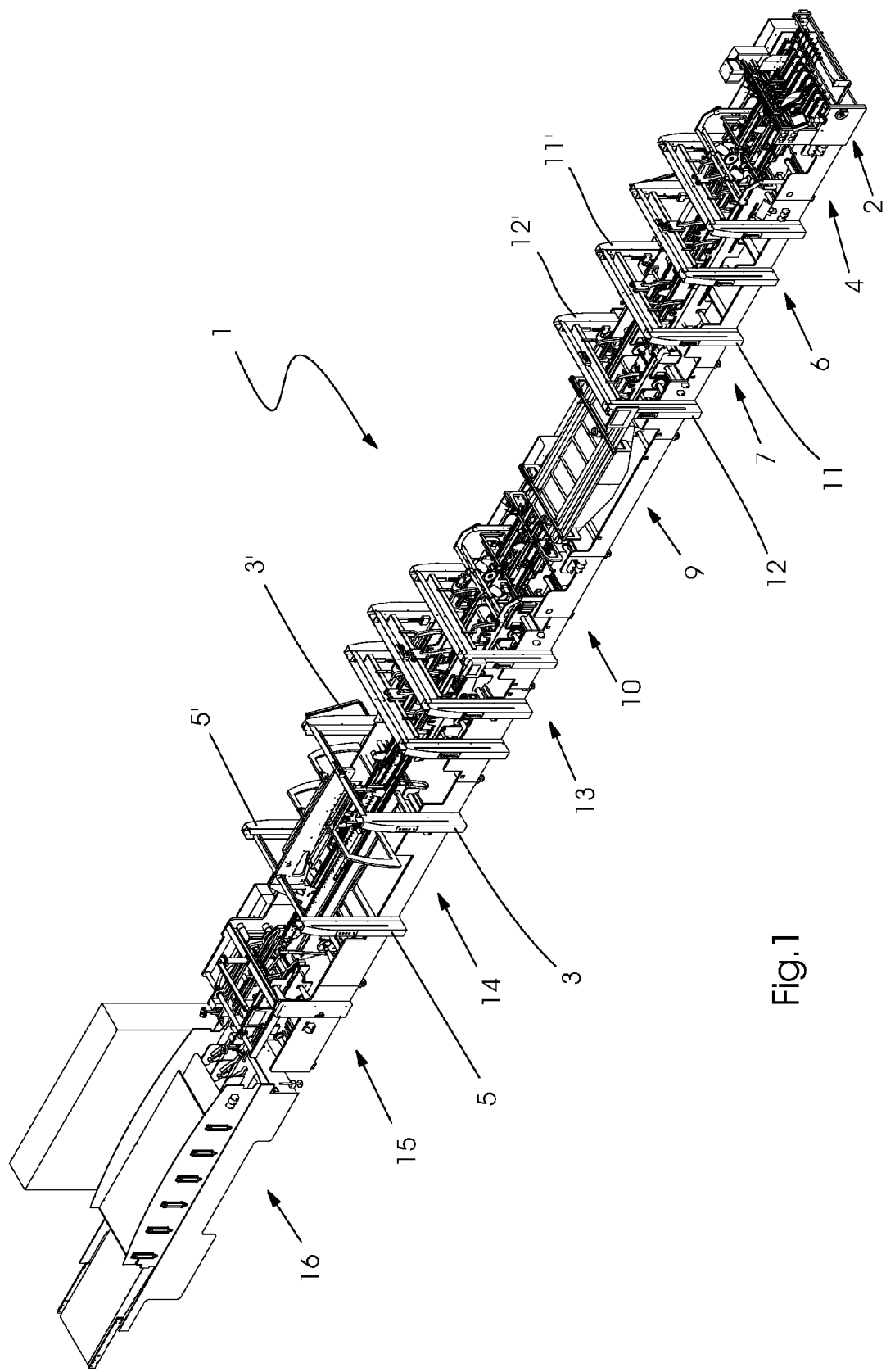
FIG. 1 is a perspective view of individual processing stations of a folded box gluing machine according to a preferred embodiment of the present invention.

The folded box gluing machine 1 includes at bottom right in FIG. 1 a feeder unit 2, which pulls the blanks being processed one by one from a stack at high speed and feeds them individually to the downstream processing station. After the feeder unit 2, an orienting station 4 is provided in which the blanks are individually oriented against a side stop. The orienting station includes machine components which may be positioned transversely (not otherwise shown) in the form of two pairs of belts, which function as feed elements and can be positioned transversely with servo-drives. Next, a rough crusher 6 and a first folding station 7 are provided. Both the rough crusher 6 and the folding station 7 include machine components which can be positioned transversely (not otherwise shown) in the form of two pairs of belts as feed elements, which can be positioned transversely with a servo-drive depending on the type of box blank. At a forward end of the folding station 7, a machine component is provided which can be positioned transversely (not shown) in the form of a glue applicator unit, which can likewise be positioned transversely with a servo-drive so that a glue strip is applied to the folding flaps being glued together.

After the folding station 7, a turning station 9 and another orienting station 10 are provided. The turning station 9 includes, for the turning of the blanks through about 90 degrees around a vertical axis, two parallel feed lanes whose speed can be adjusted separately. The blanks lie on both feed lanes, so that they are turned when the two feed lanes have different speeds. The two feed lanes include driven rollers as feed elements. In order to prevent the already folded portions of the blank from opening, the folded portions are held down by a platelike hold-down element (not shown) as they move through the turning station 9.

The next processing station 13 performs processing steps depending on the box type, for example, additional groove lines are produced or special folding is performed. Next, a second folding station 14 is provided, where portions of the blank previously provided with a glue seam are folded through about 180°. After this, a transfer station 15 is provided, from which the folded blanks with glue seams not yet hardened are precisely oriented in all portions and transported to the following gathering and pressing mechanism 16. In the gathering and pressing mechanism 16, a stream of folded blanks is first formed, and it is then held under pressure for a specific amount of time between pressing conveyor belts so that the glue seams can set. All of these processing stations include feeding units for the boxes, which are driven by servomotor drive units, for example.

An overtaking hook can be used at the folding stations 7, 14, which presents a danger to the operator during the running of the folded box gluing machine. In the case of such a machine component which presents a danger to the operator, this machine component must be protected against access. A mechanical interlock between the uprights 11, 11', 12, 12' of the folding station 7 or 3, 3', 5, 5' of the folding station 14 has adverse effects on the setup time when adjusting the machine, for example. However, the use of a light curtain according to a preferred embodiment of the present invention, which is integrated at the place of danger in the machine, has no influence on the accessibility of other machine components. In particular, because the uprights function at the same time as supports for the emergency off switch 8, for example. As can be seen from the top view, the uprights 3, 3', 5, 5', 11, 11', 12, 12' are arranged on both sides of the folding stations 7, 14. Thus, in particular, a transmitter of the light curtain can be arranged in the upright 11 and a corresponding receiver in the upright 12, for example. The same holds for the other uprights.

Figure 2:
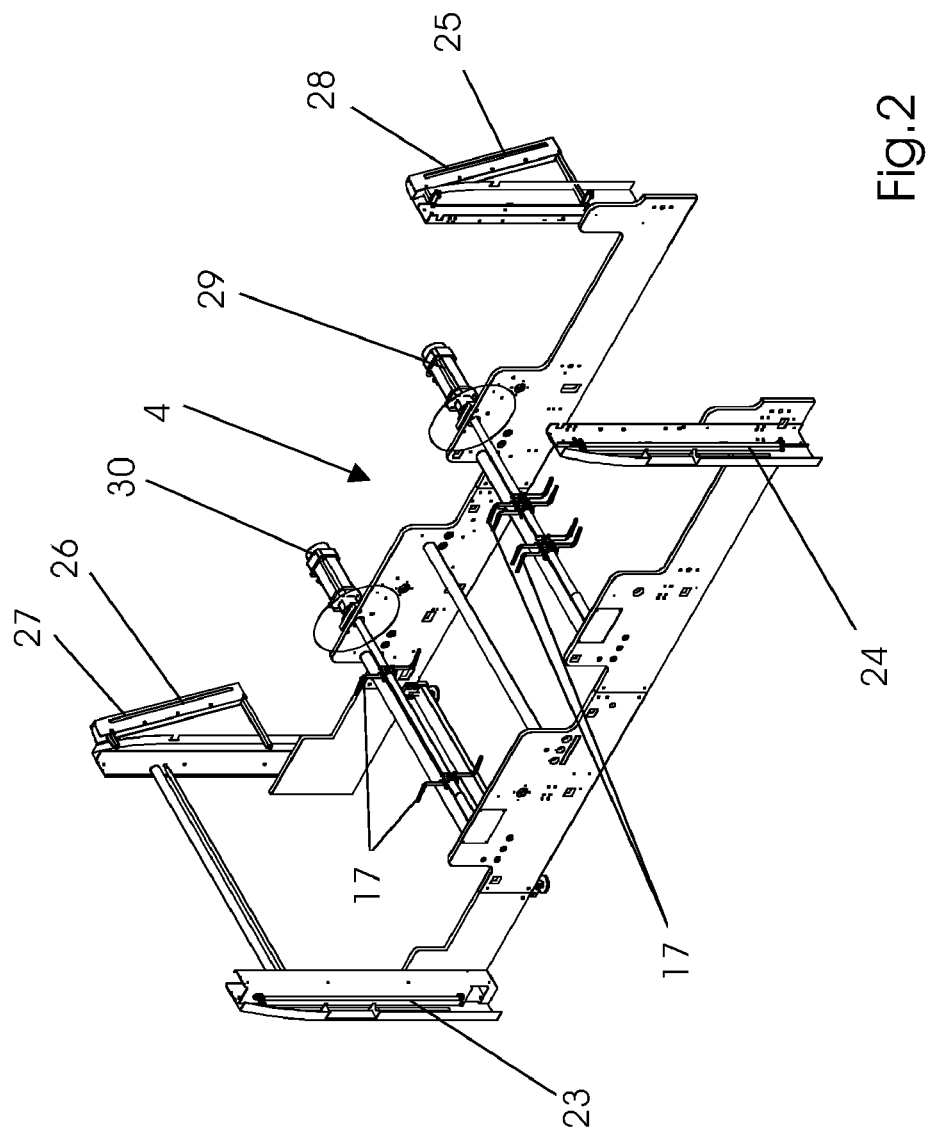
FIG. 2 is an isometric view of a portion of the folding station of the folded box gluing machine shown in FIG. 1.

FIG. 2 will now be described. The uprights 3, 3', 5, 5', 11, 11', 12, 12', which are load-bearing components of the folded box gluing machine 1, are designed such that the elements for the light curtains can be secured in the uprights 3, 3', 5, 5', 11, 11', 12, 12', and at the same time they enable the light curtains 23, 24, 25, 26 to pass through. For this, slots 27, 28 are provided in the covering sheet metal casing of the uprights, through which the transmitter of the light curtain 23, 24, 25, 26 can interact with its corresponding receiver 23, 24, 25, 26. A corresponding three-dimensional view of the arrangement of the light curtains 23, 24, 25, 26 in the folding station 4 is shown in FIG. 2. In addition, FIG. 2 shows the drive units 29, 30 of the overtaking hook 17, which are designed as servomotor drive units. The servomotor drive units 29, 30 are connected directly to the shaft on which the overtaking hooks 17 are secured.

Figure 3:
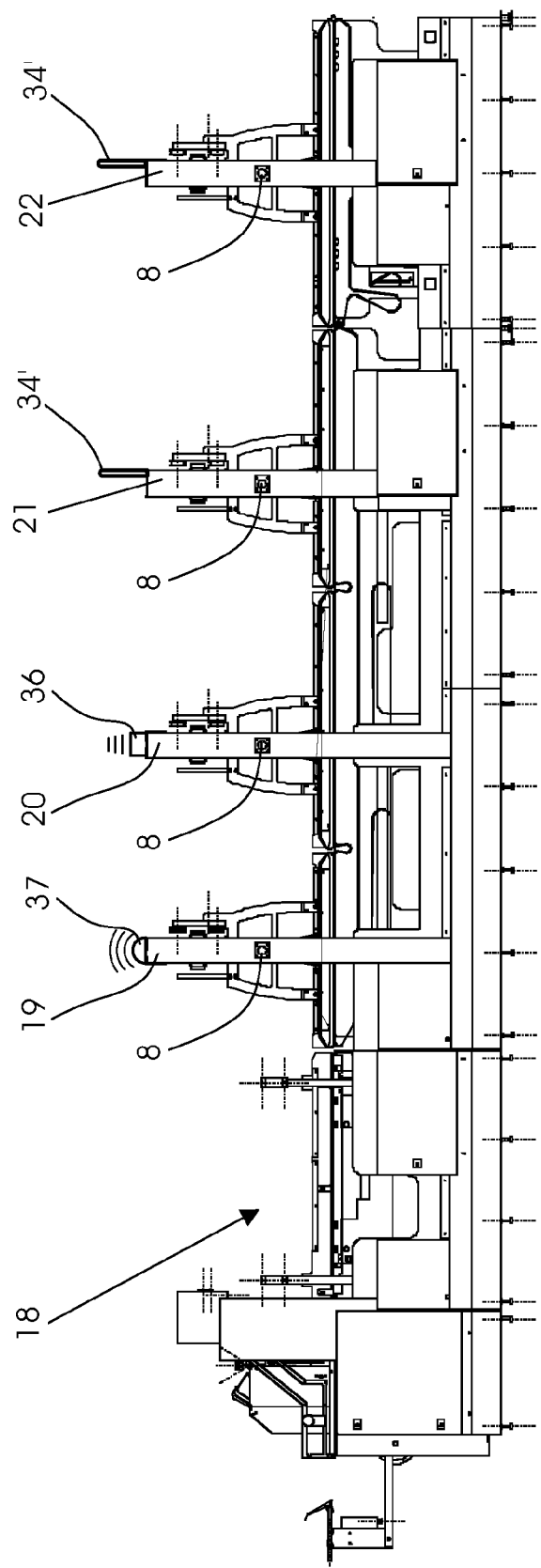
FIG. 3 is a side view of a segment of a folded box gluing machine shown in FIG. 1.

FIG. 3 shows a portion of a folded box gluing machine 18. The folded box gluing machine 18 includes several processing stations with one or more upright, 20, 21, 22. Depending on the danger to the operator, one can now safeguard an individually organized area of the machine 18 with a light curtain. Thus, for example, the light curtain could be arranged between the uprights 19 and 20 or between the uprights 19 and 21 or between the uprights 19 and 22 or the uprights 20 and 22 or any desired combination of uprights 19, 20, 21, 22.

Preferably, the light curtain 23, 24, 25, 26 can be activated in response to the activation of machine components which pose a danger, such as the overtaking hook 17. If no machine components posing a danger are in use, the light curtain 23, 24, 25, 26 is deactivated so that the machine is more accessible to the operating personnel.

The overtaking hook 17 may be arranged very far from the side edges of the folding station 7. In order to stop the folded box gluing machine and its drive units 29, 30 in an appropriately short time after an operator penetrates the light curtain 23, 24, 25, 26, it may be necessary to arrange the light curtains 25, 26 projecting to the side. A corresponding displacement of the light curtain 25, 26 is shown in FIG. 2. The lower region of the light curtain 25, 26 projects further to the side beyond the layout than does the upper region. This may also be necessary if, for example, the servomotors 29, 30 prevent an unimpeded working of the light curtain 25, 26, as shown in FIG. 2. Thus, the light curtain 25, 26 can also be disposed outside the machine components of the folding station.

If the machine is ready to run or in production and an operator approaches the light curtain 23, 24, 25, 26, so that he may enter a dangerous area, the machine switches off and comes to a halt in a short amount of time when the light curtain 23, 24, 25, 26 is interrupted. Either just the overtaking hooks themselves are halted, preferably within about 0.10 seconds, or in addition, the servomotorized feed drive units of the folded box gluing machine 1 are also stopped, so that they are fully braked within a short amount of time, for example, within about 0.25 seconds, from a folded box delivery speed of about 300 m/min to 0 m/min. In this amount of time, it is not possible for the operator to move from the region outside the light curtain 23, 24, 25, 26 into the danger zone, such as the overtaking hook 17. The folded box gluing machine thus complies with the rules of the current safety regulations.

Now, to make it possible for the operator to observe process sequences, at the middle of the machine or at the rough crusher, for example, he can deactivate the activated safety curtain using a mobile operator unit 31. However, to protect his hands from injury, this operator unit is designed as a two-hand operator unit; i.e., the safety curtain is only deactivated when the operator has both hands on the operator unit. For this purpose, the operator unit includes, as shown in FIG. 4a and 4b, two contacts defined by press switches (32, 32', 33, 33'), for example, which must be activated at the same time. The operator unit then transmits the deactivation signal either via an antenna 34 on the operator unit to an antenna 34' at the uprights or alternatively via a cable 35, which is connected at one end to the operator unit and at the other end to the uprights in a manner not otherwise depicted.

In order to give the operator additional assistance with respect to the status of the safety mechanism, the status may be indicated, as shown, by example, in FIG. 3, via an acoustical signal via a loudspeaker 36 or a signal bulb 37, which is arranged on the uprights (3, 3', 11, 11', 12, 12', 19, 20, 21, 22).

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A folded box gluing machine for processing folded box blanks, comprising:
    at least one feeder unit arranged to transport the folded box blanks to downstream processing stations including a folding station, a glue applicator unit, a transfer station, a gathering and pressing mechanism; and
    a safety mechanism for a machine component presenting a danger to an operator defined by a light curtain integrated in uprights arranged at sides of the folded box gluing machine; wherein
    the safety mechanism is deactivated via a mobile operator unit, which includes at least two contacts, and the at least two contacts can only be operated with both hands at the same time by the operator.

2. The folded box gluing machine according to claim 1, wherein the at least two contacts are disposed on opposite sides of the mobile operator unit.

3. The folded box gluing machine according to claim 1, wherein the at least two contacts are arranged on the upper side and lower side of the mobile operator unit.

4. The folded box gluing machine according to claim 1, wherein each of the at least two contacts is a press switch.

5. The folded box gluing machine according to claim 1, wherein the at least two contacts include a device arranged to perform capacitive measurement.

6. The folded box gluing machine according to claim 1, wherein the mobile operator unit is connected by a cable to the safety mechanism.

7. The folded box gluing machine according to claim 1, wherein the mobile operator unit is connected wirelessly via antennas to the safety mechanism.

8. The folded box gluing machine according to claim 1, wherein a status of the safety mechanism is indicated by at least one of an acoustic sign and an optical signal.

* * * * *